(12) United States Patent
Campbell et al.

(10) Patent No.: US 11,659,906 B2
(45) Date of Patent: May 30, 2023

(54) SUITCASE WITH WAGON-STYLE CART CAPABILITY

(71) Applicants: Alton Campbell, Baltimore, MD (US); Jacqueline Campbell, Baltimore, MD (US)

(72) Inventors: Alton Campbell, Baltimore, MD (US); Jacqueline Campbell, Baltimore, MD (US)

(*) Notice: Subject to any disclaimer, the term of this patent is extended or adjusted under 35 U.S.C. 154(b) by 92 days.

(21) Appl. No.: 17/223,125

(22) Filed: Apr. 6, 2021

(65) Prior Publication Data

US 2022/0312915 A1 Oct. 6, 2022

(51) Int. Cl.
*A45C 9/00* (2006.01)
*B62B 5/06* (2006.01)
*A45C 5/03* (2006.01)
*A45C 13/26* (2006.01)
*A45C 13/38* (2006.01)
*A45C 5/14* (2006.01)

(52) U.S. Cl.
CPC .............. *A45C 9/00* (2013.01); *A45C 5/03* (2013.01); *A45C 5/14* (2013.01); *A45C 13/262* (2013.01); *A45C 13/385* (2013.01); *B62B 5/067* (2013.01); A45C 2009/007 (2013.01); A45C 2013/267 (2013.01); B62B 2202/24 (2013.01)

(58) Field of Classification Search
CPC .... A45C 9/00; A45C 5/03; A45C 5/14; A45C 13/262; A45C 13/385; A45C 2009/007; A45C 2013/267; B62B 5/067; B62B 2202/24
See application file for complete search history.

(56) References Cited

U.S. PATENT DOCUMENTS

| 651,758 | A | * | 6/1900 | Heumader | ............... A45C 9/00 190/35 |
| 4,087,102 | A | * | 5/1978 | Sprague | ................. A45C 5/146 280/37 |
| 5,178,244 | A | | 1/1993 | Liang | |
| 5,407,039 | A | | 4/1995 | Alper | |

(Continued)

FOREIGN PATENT DOCUMENTS

WO 2016073902 5/2016
WO WO-2016209185 A1 * 12/2016

*Primary Examiner* — Jennifer Robertson
*Assistant Examiner* — Justin Caudill
(74) *Attorney, Agent, or Firm* — Kyle A. Fletcher, Esq.

(57) ABSTRACT

The suitcase with wagon-style cart capability is an item of luggage. The suitcase with wagon-style cart capability is formed as a cart. The suitcase with wagon-style cart capability: a) contains one or more domestic articles of a client; and, b) transports additional luggage items over a supporting surface. The suitcase with wagon-style cart capability is a rolling structure. The suitcase with wagon-style cart capability incorporates a suitcase, a plurality of telescopic handles, a plurality of casters, and a plurality of wheels. The plurality of telescopic handles, the plurality of casters, and the plurality of wheels attach to the exterior surface of the suitcase. The suitcase is a container used to store one or more domestic articles of the client. The exterior surfaces of the suitcases form one or more horizontally oriented supporting surfaces on which the additional luggage items of the client are placed for transport.

18 Claims, 6 Drawing Sheets

(56) References Cited

U.S. PATENT DOCUMENTS

| | | | | |
|---|---|---|---|---|
| 6,099,023 | A * | 8/2000 | Be | B62B 1/125 |
| | | | | 280/655 |
| 6,116,390 | A * | 9/2000 | Cohen | A45C 5/14 |
| | | | | 190/115 |
| 6,302,250 | B1 | 10/2001 | Sadow | |
| D492,110 | S | 6/2004 | Van Himbeeck | |
| 8,561,769 | B2 * | 10/2013 | Andochick | A45C 5/14 |
| | | | | 190/18 R |
| 9,848,681 | B1 * | 12/2017 | Chen | A45C 5/03 |
| 10,463,123 | B2 | 11/2019 | Moskowitz | |
| 2007/0215424 | A1 | 9/2007 | Mittleman | |
| 2010/0018821 | A1 * | 1/2010 | Minaker | B62B 5/06 |
| | | | | 190/115 |
| 2012/0228074 | A1 * | 9/2012 | Osler | A45C 7/0045 |
| | | | | 190/18 A |
| 2013/0037364 | A1 * | 2/2013 | Ready | A45C 5/03 |
| | | | | 190/18 A |
| 2016/0242518 | A1 * | 8/2016 | Kennedy | A45C 5/14 |
| 2017/0360165 | A1 * | 12/2017 | Hamaty | A45C 9/00 |
| 2018/0116353 | A1 * | 5/2018 | Howell | A45C 9/00 |
| 2018/0303456 | A1 * | 10/2018 | Tawil | A61B 5/7445 |
| 2019/0142123 | A1 * | 5/2019 | Yu | A45C 13/103 |
| | | | | 190/108 |

\* cited by examiner

SUITCASE WITH WAGON-STYLE CART CAPABILITY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of travelling articles including luggage, more specifically, a special adaptation of handles for wheeled luggage. (A45C13/262)

SUMMARY OF INVENTION

The suitcase with wagon-style cart capability is an item of luggage. The suitcase with wagon-style cart capability is formed as a cart. The suitcase with wagon-style cart capability: a) contains one or more domestic articles of a client; and, b) transports additional luggage items over a supporting surface. The suitcase with wagon-style cart capability is a rolling structure. The suitcase with wagon-style cart capability comprises a suitcase, a plurality of telescopic handles, a plurality of casters, and a plurality of wheels. The plurality of telescopic handles, the plurality of casters, and the plurality of wheels attach to the exterior surface of the suitcase. The suitcase is a container used to store one or more domestic articles of the client. The exterior surfaces of the suitcases form one or more horizontally oriented supporting surfaces on which the additional luggage items of the client are placed for transport. Each of the plurality of telescopic handles forms grips used to manipulate the suitcase with wagon-style cart capability. Each of the plurality of casters and each of the plurality of wheels allow the suitcase with wagon-style cart capability to roll over the supporting surface.

These together with additional objects, features and advantages of the suitcase with wagon-style cart capability will be readily apparent to those of ordinary skill in the art upon reading the following detailed description of the presently preferred, but nonetheless illustrative, embodiments when taken in conjunction with the accompanying drawings.

In this respect, before explaining the current embodiments of the suitcase with wagon-style cart capability in detail, it is to be understood that the suitcase with wagon-style cart capability is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the suitcase with wagon-style cart capability.

It is therefore important that the claims be regarded as including such equivalent construction insofar as they do not depart from the spirit and scope of the suitcase with wagon-style cart capability. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
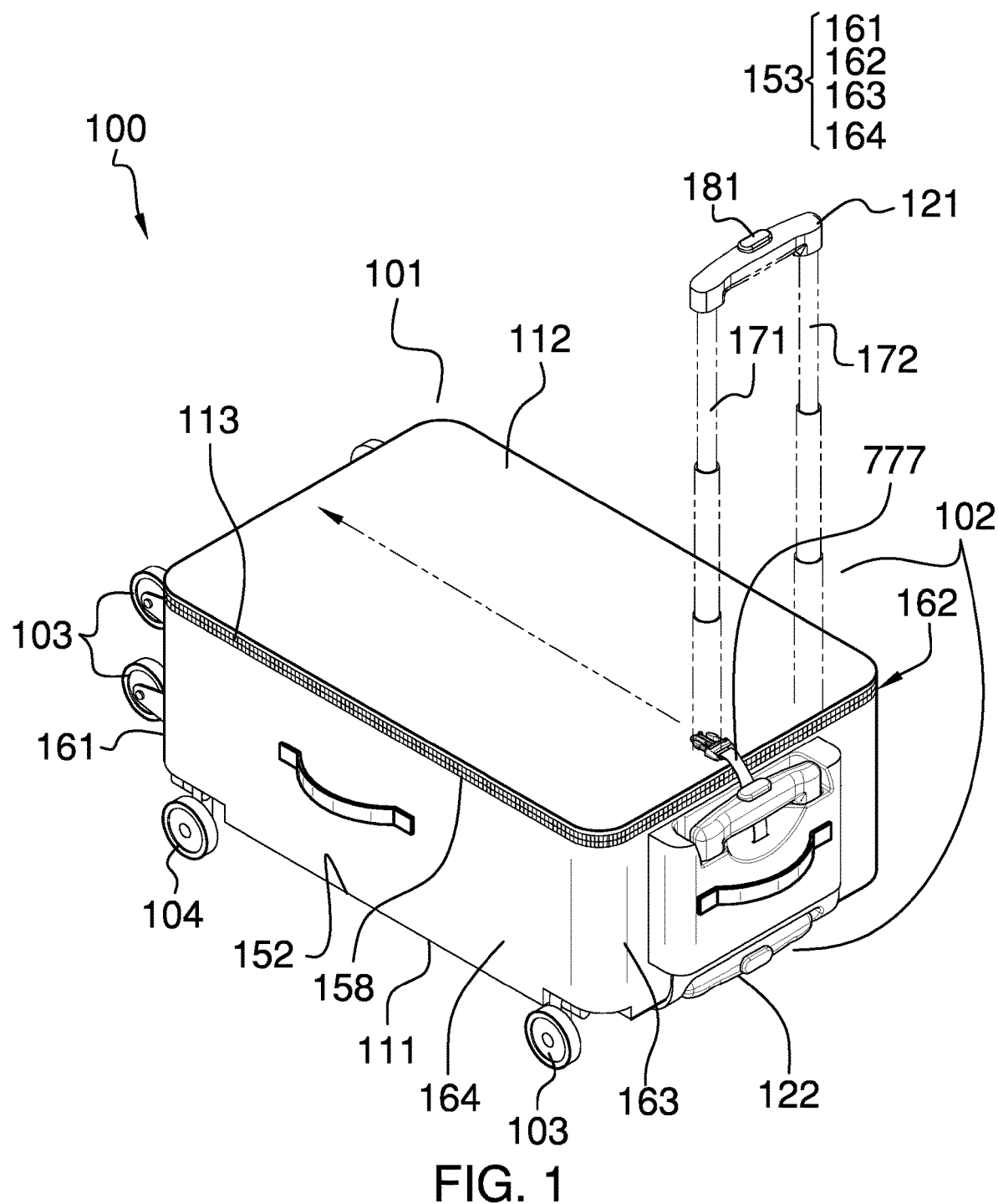
FIG. 1 is a perspective view of an embodiment of the disclosure.
Figure 2:
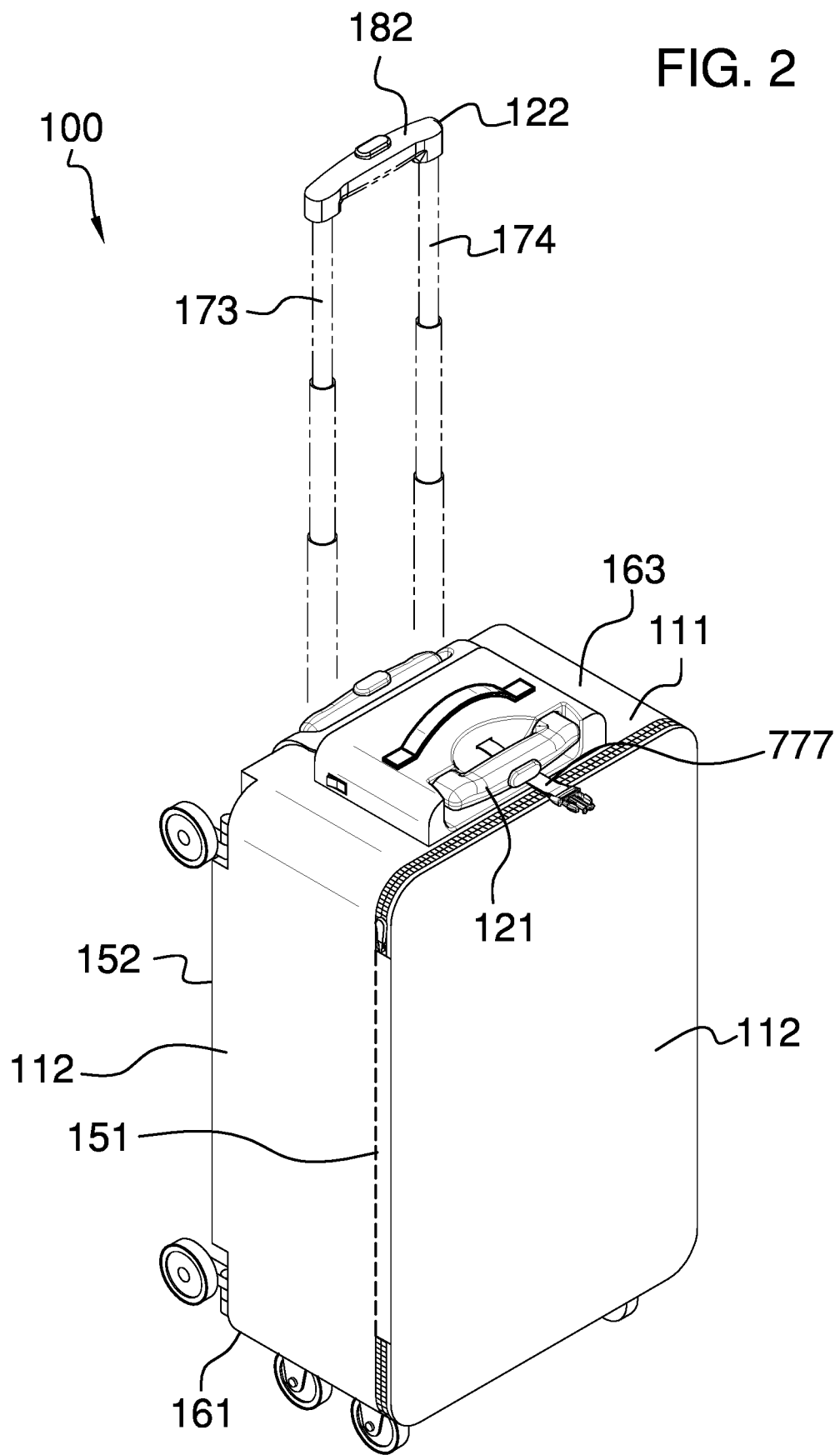
FIG. 2 is a perspective view of an embodiment of the disclosure.
Figure 3:
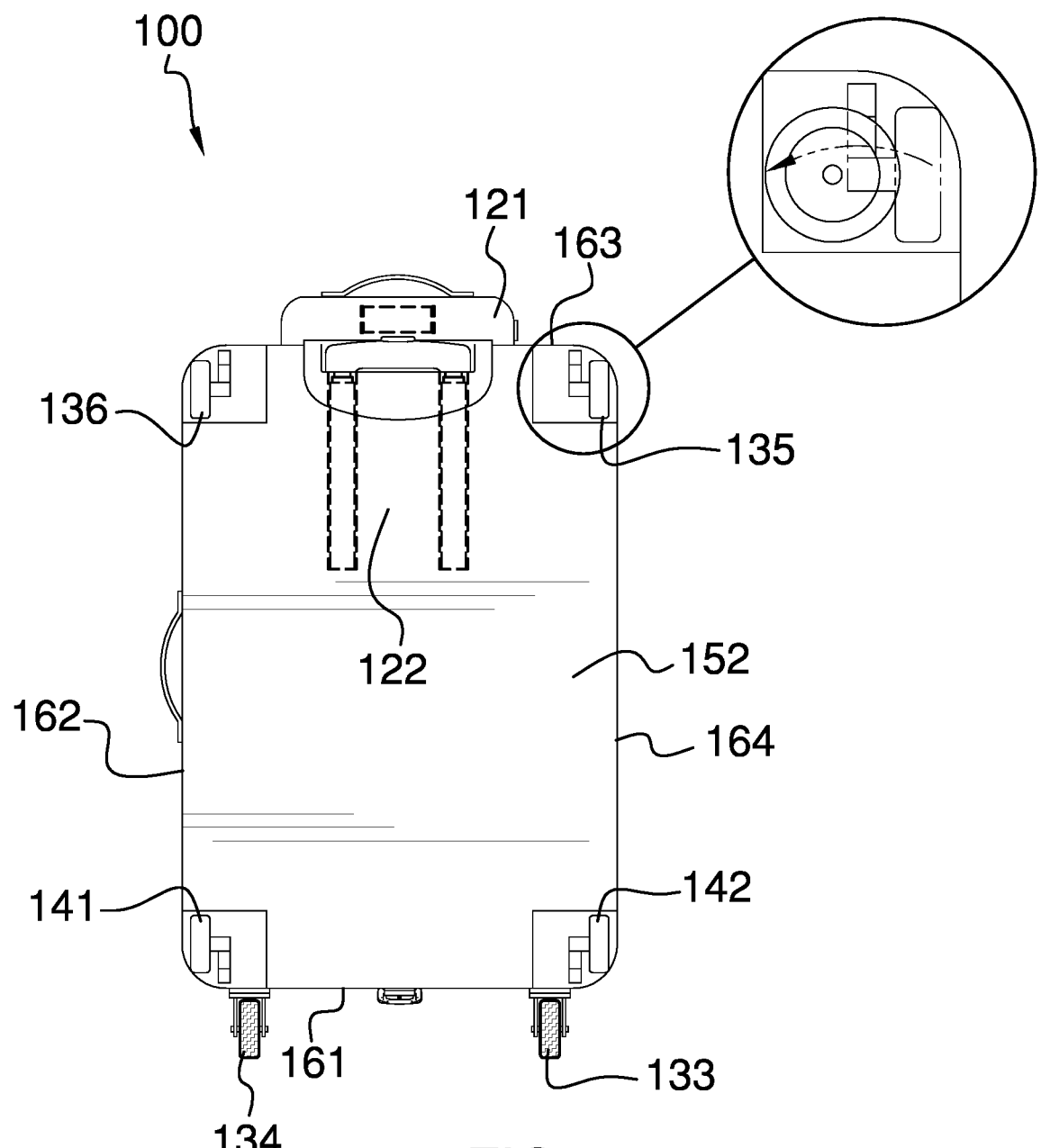
FIG. 3 is a congruent end view of an embodiment of the disclosure.
Figure 4:
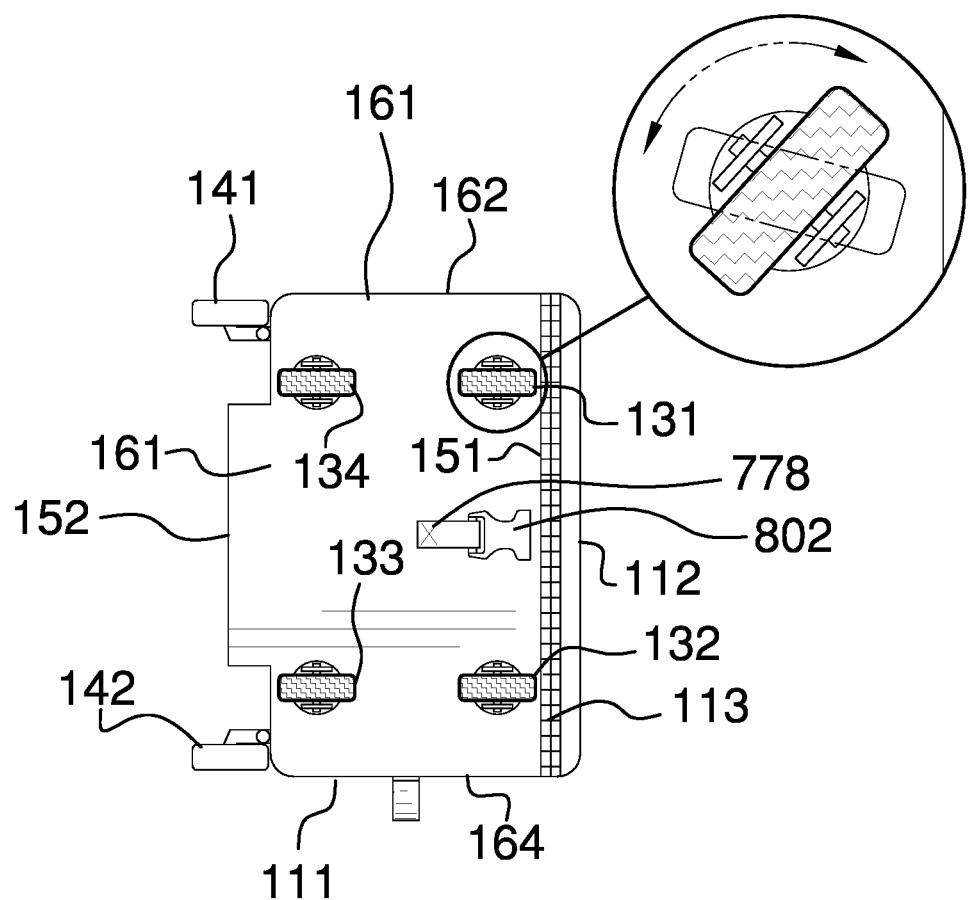
FIG. 4 is a lateral face view of an embodiment of the disclosure.
Figure 5:
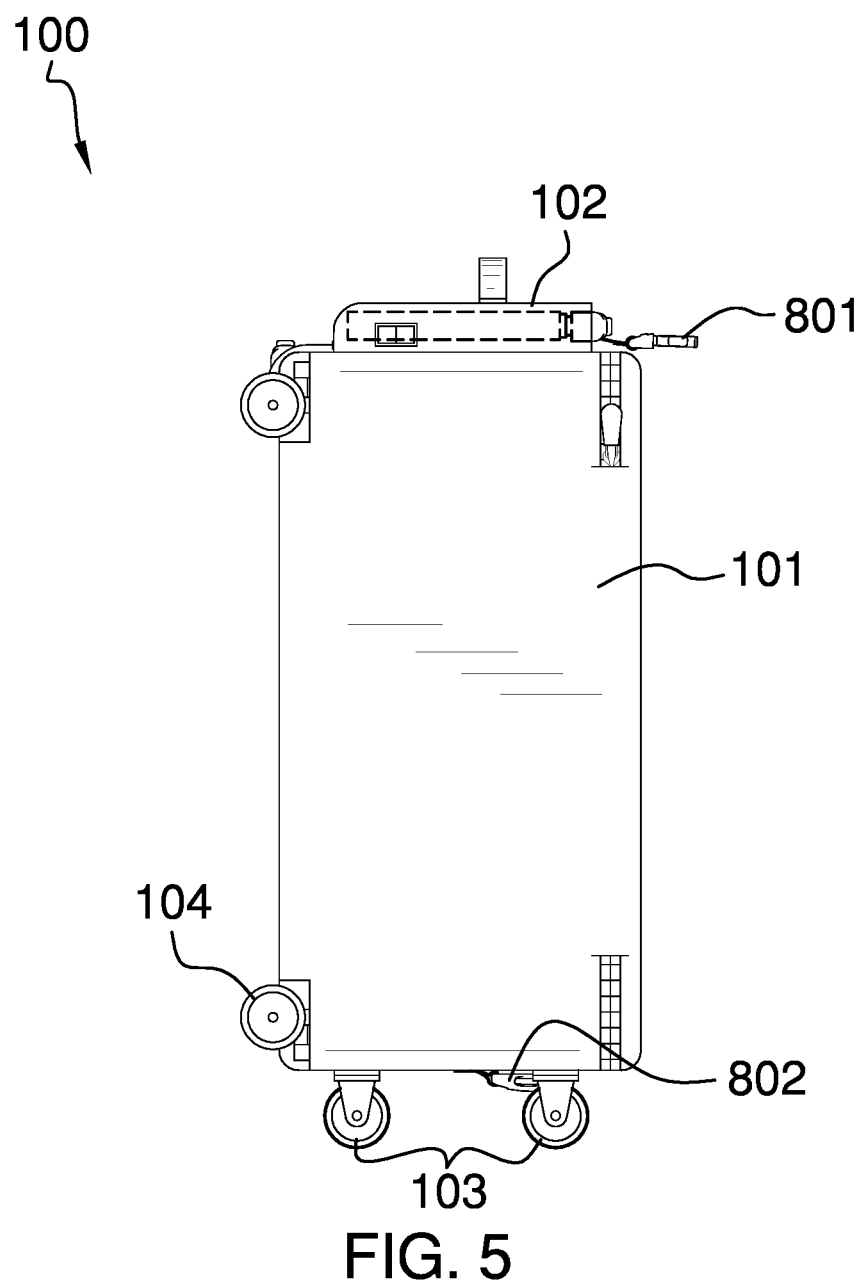
FIG. 5 is a lateral face view of an embodiment of the disclosure.
Figure 6:
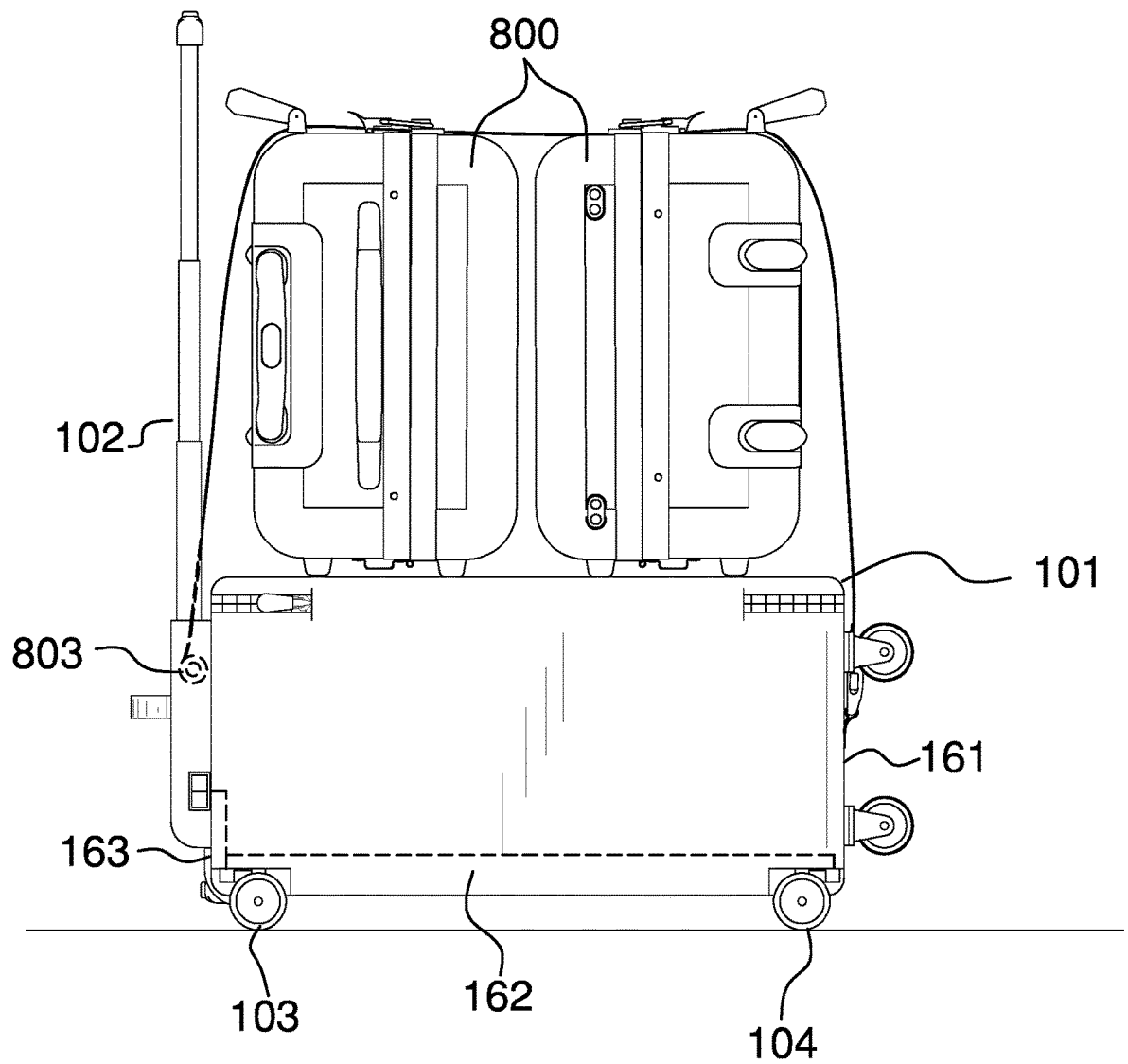
FIG. 6 is an in-use view of an embodiment of the disclosure.

Detailed reference will now be made to one or more potential embodiments of the disclosure, which are illustrated in FIGS. 1 through 6.

The suitcase with wagon-style cart capability 100 (hereinafter invention) is an item of luggage. The invention 100 is formed as a cart. The invention 100: a) contains one or more domestic articles of a client; and, b) transports additional luggage items over a supporting surface. The invention 100 is a rolling structure.

The invention 100 comprises a suitcase 101, a plurality of telescopic handles 102, a plurality of casters 103, and a plurality of wheels 104. The plurality of telescopic handles 102, the plurality of casters 103, and the plurality of wheels 104 attach to the exterior surface of the suitcase 101. The suitcase 101 is a container used to store one or more domestic articles of the client. The exterior surfaces of the suitcase 101 form one or more horizontally oriented supporting surfaces on which the additional luggage items of the client are placed for transport. Each of the plurality of telescopic handles 102 form grips used to manipulate the invention 100. Each of the plurality of casters 103 and each of the plurality of wheels 104 allow the invention 100 to roll over the supporting surface.

The suitcase 101 is a prism-shaped structure. The suitcase 101 is a hollow structure. The suitcase 101 forms a protected space used to store one or more domestic articles of the client. The suitcase 101 is an enclosable structure. The suitcase 101 has a rectangular block structure. The suitcase 101 comprises a pan structure 111, a lid structure 112, and a fastening structure 113.

The pan structure 111 is a prism-shaped structure. The pan structure 111 is formed as a pan. The pan is defined elsewhere in this disclosure. The pan structure 111 forms the physical containment space used to store the one or more domestic articles of the client. The pan structure 111 comprises an open congruent end 151, a closed congruent end 152, and a plurality of lateral faces 153.

The open congruent end 151 is the open surface of the pan structure 111 of the suitcase 101. The one or more domestic articles of the client are placed into and removed from the pan structure 111 through the open congruent end 151 of the pan structure 111. The closed congruent end 152 is the closed face of the pan structure 111 of the suitcase 101. The closed congruent end 152 forms a portion of the containment barrier of the pan structure 111. The closed congruent end 152 is the surface of the pan structure 111 that is distal from the open congruent end 151.

The plurality of lateral faces 153 forms a portion of the containment barrier of the pan structure 111. The plurality of lateral faces 153 forms the containment structures of the pan structure 111 that are perpendicular to the closed congruent end 152. The plurality of lateral faces 153 further comprises a first lateral face 161, a second lateral face 162, a third lateral face 163, and a fourth lateral face 164.

The third lateral face 163 is a disk-shaped structure. The third lateral face 163 is the lateral face selected from the plurality of lateral faces 153 that has the congruent ends with the least surface area. The fourth lateral face 164 is a disk-shaped structure. The second lateral face 162 is the lateral face selected from the plurality of lateral faces 153 that has the congruent ends with the greatest surface area. The first lateral face 161 is a disk-shaped structure. The first lateral face 161 is the lateral face selected from the plurality of lateral faces 153 that is distal from the third lateral face 163. The second lateral face 162 is a disk-shaped structure. The second lateral face 162 is the lateral face selected from the plurality of lateral faces 153 that is distal from the fourth lateral face 164.

The lid structure 112 is a prism-shaped structure. The lid structure 112 is geometrically similar to the open congruent end 151 of the pan structure 111 such that the lid structure 112 will enclose the open congruent end 151 of the pan structure 111. The lid structure 112 controls access into the hollow interior of the pan structure 111 through the open congruent end 151. The lid structure 112 rotates between an open position and a closed position. The lid structure 112 forms the physical containment space used to store the one or more horizontally oriented supporting surfaces on which the one or more additional luggage items of the client rest when the invention 100 is used as a cart.

The fastening structure 113 secures the lid structure 112 to the pan structure 111. The fastening structure 113 secures the lid structure 112 to the pan structure 111 such that the lId structure 112 rotates relative to the pan structure 111. The fastening structure 113 secures the lid structure 112 into a closed position that encloses the one or more domestic articles of the client within the suitcase 101.

Each of the plurality of telescopic handles 102 is a mechanical structure. Each of the plurality of telescopic handles 102 forms a grip that is used to manipulate the invention 100. Each of the plurality of telescopic handles 102 is an extendable structure. By extendable is meant that the reach of the plurality of telescopic handles 102 relative to the suitcase 101 is adjustable. Each of the plurality of telescopic handles 102 mounts on the exterior surface of the suitcase 101 such that a cant is formed between any initially selected telescopic handle selected from the plurality of telescopic handles 102 and any subsequent telescopic handle selected from the plurality of telescopic handles 102. The plurality of telescopic handles 102 comprises a first telescopic handle 121 and a second telescopic handle 122.

The first telescopic handle 121 is a grip used to manipulate the invention 100. The reach of the first telescopic handle 121 is adjustable. The first telescopic handle 121 forms a u-shaped structure. The adjustable nature of the first telescopic handle 121 allows the first telescopic handle 121 to accommodate variations in the height of different clients. The first telescopic handle 121 attaches to the third lateral face 163 of the pan structure 111. The first telescopic handle 121 comprises a first telescopic structure 171, a second telescopic structure 172, and a first grip 181. In the first potential embodiment of the disclosure, the second telescopic handle 122 forms a perpendicular cant with the first telescopic handle 121.

The first telescopic structure 171 is a composite prism structure. The first telescopic structure 171 forms the first arm of the u-shaped structure of the first telescopic handle 121. The first telescopic structure 171 attaches the first grip 181 to the third lateral face 163 of the pan structure 111. The first telescopic structure 171 attaches to an end of the first grip 181 such that the center axis of the composite prism structure of the first telescopic structure 171 is perpendicular to the center axis of the first grip 181. The first telescopic structure 171 is a telescopic device. By telescopic is meant that the span of the length of the center axis of the composite prism structure of the first telescopic structure 171 is adjustable. The reach of the first telescopic handle 121 adjusts by adjusting the span of the length of the center axis of the composite prism structure of the first telescopic structure 171.

The second telescopic structure 172 is a composite prism structure. The second telescopic structure 172 forms the second arm of the u-shaped structure of the first telescopic handle 121. The second telescopic structure 172 attaches the first grip 181 to the third lateral face 163 of the pan structure 111. The second telescopic structure 172 attaches to an end of the first grip 181 such that the center axis of the composite prism structure of the second telescopic structure 172 is perpendicular to the center axis of the first grip 181. The second telescopic structure 172 attaches to the end of the first grip 181 that is distal from the first telescopic structure 171. The second telescopic structure 172 is a telescopic device. By telescopic is meant that the span of the length of the center axis of the composite prism structure of the second telescopic structure 172 is adjustable. The reach of the first telescopic handle 121 adjusts by adjusting the span of the length of the center axis of the composite prism structure of the second telescopic structure 172.

The first grip 181 is a prism-shaped structure. The first grip 181 forms the crossbeam of the u-shaped structure of the first telescopic handle 121. The first grip 181 attaches to the first telescopic structure 171 and the second telescopic structure 172. The first grip 181 attaches to the ends of the first telescopic structure 171 and the second telescopic structure 172 that are distal from the third lateral face 163 of the pan structure 111. The first grip 181 forms the graspable structure used to manipulate the invention 100.

The second telescopic handle 122 is a grip used to manipulate the invention 100. The reach of the second telescopic handle 122 is adjustable. The second telescopic handle 122 forms a u-shaped structure. The u-shaped structure is defined elsewhere in this disclosure. The adjustable nature of the second telescopic handle 122 allows the second telescopic handle 122 to accommodate variations in the height of different clients. The second telescopic handle 122 attaches to the third lateral face 163 of the pan structure 111. The second telescopic handle 122 attaches to the pan structure 111 such that the direction of the expansion of the reach of the second telescopic handle 122 forms a cant with the direction of the expansion of the reach of the first telescopic handle 121. The second telescopic handle 122 comprises a third telescopic structure 173, a fourth telescopic structure 174, and a second grip 182.

The third telescopic structure 173 is a composite prism structure. The third telescopic structure 173 forms the first arm of the u-shaped structure of the second telescopic handle 122. The third telescopic structure 173 attaches the second grip 182 to the third lateral face 163 of the pan structure 111. The third telescopic structure 173 attaches to an end of the second grip 182 such that the center axis of the composite prism structure of the third telescopic structure 173 is perpendicular to the center axis of the second grip 182. The third telescopic structure 173 is a telescopic device. By telescopic is meant that the span of the length of the center axis of the composite prism structure of the third telescopic structure 173 is adjustable. The reach of the second telescopic handle 122 adjusts by adjusting the span of the length of the center axis of the composite prism structure of the third telescopic structure 173.

The fourth telescopic structure 174 is a composite prism structure. The fourth telescopic structure 174 forms the second arm of the u-shaped structure of the second telescopic handle 122. The fourth telescopic structure 174 attaches the second grip 182 to the third lateral face 163 of the pan structure 111. The fourth telescopic structure 174 attaches to an end of the second grip 182 such that the center axis of the composite prism structure of the fourth telescopic structure 174 is perpendicular to the center axis of the second grip 182. The fourth telescopic structure 174 attaches to the end of the second grip 182 that is distal from the third telescopic structure 173. The fourth telescopic structure 174 is a telescopic device. By telescopic is meant that the span of the length of the center axis of the composite prism structure of the fourth telescopic structure 174 is adjustable. The reach of the second telescopic handle 122 adjusts by adjusting the span of the length of the center axis of the composite prism structure of the fourth telescopic structure 174.

The second grip 182 is a prism-shaped structure. The second grip 182 forms the crossbeam of the u-shaped structure of the second telescopic handle 122. The second grip 182 attaches to the third telescopic structure 173 and the fourth telescopic structure 174. The second grip 182 attaches to the ends of the third telescopic structure 173 and the fourth telescopic structure 174 that are distal from the third lateral face 163 of the pan structure 111. The second grip 182 forms the graspable structure used to manipulate the invention 100.

Each of the plurality of casters 103 is a caster. The caster is defined elsewhere in this disclosure. Each of the plurality of casters 103 attaches to the exterior surface of the suitcase 101 such that the caster will form a load path that transfers the load of the suitcase 101 to a supporting surface. Each of the plurality of casters 103 attaches to an exterior surface of the suitcase 101 that is selected from the group consisting of the closed congruent end 152 of the pan structure 111 and the first lateral face 161 of the pan structure 111.

Each of the plurality of casters 103 is a rotating structure that rotates around a first axis of rotation such that the plurality of casters 103 will roll the suitcase 101 over the supporting surface. Each of the plurality of casters 103 rotates around a swivel that rotates around a second axis of rotation such that the path of the rotation of each of the plurality of casters 103 will adjust to changes in the primary sense of direction of the invention 100. The plurality of casters 103 comprises a first caster 131, a second caster 132, a third caster 133, a fourth caster 134, a fifth caster 135, and a sixth caster 136.

The first caster 131 is a rotating structure. The first caster 131 attaches to the exterior surface of the closed congruent end 152. The second caster 132 is a rotating structure. The second caster 132 attaches to the exterior surface of the closed congruent end 152. The third caster 133 is a rotating structure. The third caster 133 attaches to the exterior surface of the closed congruent end 152. The fourth caster 134 is a rotating structure. The fourth caster 134 attaches to the exterior surface of the closed congruent end 152.

When the first caster 131, the second caster 132, the third caster 133, and the fourth caster 134 combine to transfer the full load of the invention 100 to the supporting surface, the lid structure 112 of the suitcase 101 forms a horizontally oriented surface used to elevate and transport the one or more additional luggage items of the client. The first caster 131, the second caster 132, the third caster 133, and the fourth caster 134 combine to allow the invention 100 to roll over a supporting surface.

The fifth caster 135 is a rotating structure. The fifth caster 135 attaches to the exterior surface of the first lateral face 161. The sixth caster 136 is a rotating structure. The sixth caster 136 attaches to the exterior surface of the first lateral face 161.

Each of the plurality of wheels 104 is a wheel. The wheel is defined elsewhere in this disclosure. Each of the plurality of wheels 104 attaches to the exterior surface of the suitcase 101 such that the wheel will form a load path that transfers the load of the suitcase 101 to a supporting surface. Each of the plurality of wheels 104 attaches to the exterior surface of the closed congruent end 152 of the pan structure 111. Each of the plurality of wheels 104 is a rotating structure that rotates around a first axis of rotation such that the plurality of wheels 104 will roll the suitcase 101 over the supporting surface. The plurality of wheels 104 comprises a first wheel 141 and a second wheel 142.

The first wheel 141 is a rotating structure. The first wheel 141 attaches to the exterior surface of the first lateral face 161. The second wheel 142 is a rotating structure. The second wheel 142 attaches to the exterior surface of the first lateral face 161. The fifth caster 135, the sixth caster 136, the first wheel 141, and the second wheel 142 combine to allow the invention 100 to roll over a supporting surface.

The invention 100 may include a first strap 777. The first strap 777 extends from the third lateral face 163, and is adjustable in length. The first strap 777 is designed to extend over top of the lid structure 112 in order to secure other items 800 thereon. It shall be noted that the other items 800 may involve other items of luggage. The fourth lateral face 164 has a second strap 778. The first strap 777 is able to secured to the second strap 778 via a male clip 801 and a female clip 802, respectively. The male clip 801 and the female clip 802 are well known in the art. The first strap 777 may be wound on a spring-loaded spindle 803 located within the invention 100

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Barrier: As used in this disclosure, a barrier is a physical obstacle that forms a boundary between a first space and a second space. The barrier prevents the passage of an object between the first space and the second space.

Cant: As used in this disclosure, a cant is an angular deviation from one or more reference lines (or planes) such as a vertical line (or plane) or a horizontal line (or plane).

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Cart: As used in this disclosure, a cart is small vehicle intended to be moved by a person. A synonym for cart is hand cart.

Caster: As used in this disclosure, a caster is a wheel that is mounted on a swivel that allows the wheel to adjust, or swivel, the direction of rotation of the wheel to the direction of motion desired for the wheel. The generic parts of a caster are called the stem, the swivel bearing, the swivel mount and the wheel. The swivel bearing attaches the stem to the swivel mount such that the swivel mount will rotate relative to the stem. The wheel attaches to the swivel mount such that the wheel freely rotates relative to the swivel mount. The direction of the axis of rotation of the wheel is perpendicular to the direction of the axis of rotation of the swivel mount. The stem attaches the swivel bearing, the swivel mount, and the wheel to an externally provided object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Client: As used in this disclosure, a client is an individual who is designated to receive the services of the disclosure at bar.

Closed Position: As used in this disclosure, a closed position refers to a movable barrier structure that is in an orientation that prevents passage through a port or an aperture. The closed position is often referred to as an object being "closed." Always use orientation.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Enclose: As used in this disclosure, to enclose means to segregate or surround a space or an object from all sides. The noun form of enclose is enclosure.

Enclosable: As used in this disclosure, enclosable refers to an enclosed space that is formed with a port that changes between a closed position and an open position such that access into the enclosed space is both available and controllable.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Luggage: As used in this disclosure, luggage is a trunk, bag, parcel, suitcase, or backpack in which domestic articles are contained during travel.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Open Position: As used in this disclosure, an open position refers to a movable barrier structure that is in an orientation that allows passage through a port or an aperture. The open position is often referred to as an object being "open."

Orientation: As used in this disclosure, orientation refers to the positioning of a first object relative to: 1) a second object; or, 2) a fixed position, location, or direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

Perimeter: As used in this disclosure, a perimeter is one or more curved or straight lines that bounds an enclosed area on a plane or surface. The perimeter of a circle is commonly referred to as a circumference.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a space formed by a boundary structure. The boundary structure forms a barrier that protects objects within the protected space from potential dangers from the other side of the boundary.

Reach: As used in this disclosure, reach refers to a span of distance between any two objects.

Rectangular Block: As used in this disclosure, a rectangular block refers to a three-dimensional prism structure comprising six rectangular surfaces (commonly called faces) formed at right angles. Within this disclosure, a rectangular block may further comprise rounded edges and corners.

Roll: As used in this disclosure, the term roll refers to the rotation of an object around an axis or center of rotation. The term roll is often used in the context of the motion of an object that is facilitated by the rotation of one or more wheels or a casters.

Rounded: A used in this disclosure, the term rounded refers to the replacement of an apex, vertex, or edge or brink of a structure with a (generally smooth) curvature wherein the concave portion of the curvature faces the interior or center of the structure.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Swivel: As used in this disclosure, a swivel is a fastening structure that attaches a first object to a second object such that will rotate around an axis of rotation while the second object remains in a fixed position relative to the first object.

Telescopic: As used in this disclosure, telescopic is an adjective that describes a composite prism structure made of hollow prism-shaped sections that fit or slide into each other such that the composite prism structure can be made longer or shorter by adjusting the relative positions of the hollow prism-shaped sections.

U-Shaped Structure: As used in this disclosure, a U-shaped structure refers to a three-sided structure comprising a crossbeam, a first arm, and a second arm. In a U-shaped structure, the first arm and the second arm project away from the crossbeam: 1) in the same direction; 2) at a roughly perpendicular angle to the crossbeam, and, 3) the span of the length of the first arm roughly equals the span of the length of the second arm. The first arm and the second arm project away from the crossbeam in the manner of a cantilever. An illiterate U-shaped structure is a U-shaped structure where the span of the length of the first arm does not equal the span of the length of the second arm.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A suitcase with wagon-style cart capability comprising a suitcase, a plurality of telescopic handles, a plurality of casters, and a plurality of wheels;
wherein the plurality of telescopic handles, the plurality of casters, and the plurality of wheels attach to the exterior surface of the suitcase;
wherein the suitcase with wagon-style cart capability is an item of luggage;
wherein the suitcase with wagon-style cart capability is formed as a cart;
wherein the suitcase with wagon-style cart capability transports additional luggage items over a supporting surface;
wherein the suitcase with wagon-style cart capability is a rolling structure;
wherein the plurality of telescopic handles comprises a first telescopic handle and a second telescopic handle;
wherein the first telescopic handle comprises a first telescopic structure, a second telescopic structure, and a first grip;
wherein the second telescopic handle forms a perpendicular cant with the first telescopic handle;
wherein the suitcase comprises a pan structure, a lid structure, and a fastening structure;
wherein the fastening structure secures the lid structure to the pan structure;
wherein the reach of the first telescopic handle is adjustable;
wherein the first telescopic handle forms a u-shaped structure;
wherein the adjustable nature of the first telescopic handle allows the first telescopic handle to accommodate variations in the height of different clients;
wherein the first telescopic handle attaches to the third lateral face of the pan structure;
wherein the reach of the second telescopic handle is adjustable;
wherein the second telescopic handle forms a u-shaped structure;
wherein the adjustable nature of the second telescopic handle allows the second telescopic handle to accommodate variations in the height of different clients;
wherein the second telescopic handle attaches to the third lateral face of the pan structure.

2. The suitcase with wagon-style cart capability according to claim 1
wherein the suitcase is a container;
wherein the exterior surfaces of the suitcase form one or more horizontally oriented supporting surfaces on which the additional luggage items of a client are placed for transport;
wherein each of the plurality of telescopic handles form grips used to manipulate the suitcase with wagon-style cart capability;
wherein each of the plurality of casters and each of the plurality of wheels allow the suitcase with wagon-style cart capability to roll over the supporting surface.

3. The suitcase with wagon-style cart capability according to claim 2
wherein the suitcase is a hollow structure;
wherein the suitcase forms a protected space;
wherein the suitcase is an enclosable structure;
wherein the suitcase has a rectangular block structure.

4. The suitcase with wagon-style cart capability according to claim 3
wherein each of the plurality of telescopic handles is a mechanical structure;
wherein each of the plurality of telescopic handles forms a grip that is used to manipulate the suitcase with wagon-style cart capability;
wherein each of the plurality of telescopic handles is an extendable structure;
wherein by extendable is meant that the reach of the plurality of telescopic handles relative to the suitcase is adjustable;
wherein each of the plurality of telescopic handles mounts on the exterior surface of the suitcase such that a cant is formed between any initially selected telescopic handle selected from the plurality of telescopic handles and any subsequent telescopic handle selected from the plurality of telescopic handles.

5. The suitcase with wagon-style cart capability according to claim 4
wherein the first telescopic handle is a grip used to manipulate the suitcase with wagon-style cart capability;

wherein the second telescopic handle is a grip used to manipulate the suitcase with wagon-style cart capability;

wherein the first telescopic handle attaches to the pan structure;

wherein the second telescopic handle attaches to the pan structure.

6. The suitcase with wagon-style cart capability according to claim 5 wherein each of the plurality of casters is a caster;

wherein each of the plurality of casters attaches to the exterior surface of the suitcase such that the caster will form a load path that transfers the load of the suitcase to a supporting surface.

7. The suitcase with wagon-style cart capability according to claim 6 wherein each of the plurality of wheels is a wheel;

wherein each of the plurality of wheels attaches to the exterior surface of the suitcase such that the wheel will form a load path that transfers the load of the suitcase to a supporting surface.

8. The suitcase with wagon-style cart capability according to claim 7 wherein the pan structure is formed as a pan;

wherein the pan structure forms the physical containment space of the suitcase with wagon-style cart capability.

9. The suitcase with wagon-style cart capability according to claim 8 wherein the pan structure comprises an open congruent end, a closed congruent end, and a plurality of lateral faces;

wherein the open congruent end is the open surface of the pan structure of the suitcase;

wherein articles are placed into and removed from the pan structure through the open congruent end of the pan structure;

wherein the closed congruent end is the closed face of the pan structure of the suitcase;

wherein the closed congruent end forms a portion of the containment barrier of the pan structure;

wherein the closed congruent end is the surface of the pan structure that is distal from the open congruent end;

wherein the plurality of lateral faces forms a portion of the containment barrier of the pan structure;

wherein the plurality of lateral faces forms the containment structures of the pan structure that are perpendicular to the closed congruent end.

10. The suitcase with wagon-style cart capability according to claim 9 wherein the plurality of lateral faces further comprises a first lateral face, a second lateral face, a third lateral face, and a fourth lateral face;

wherein the third lateral face is a disk-shaped structure;

wherein the third lateral face is the lateral face selected from the plurality of lateral faces that has the congruent ends with the least surface area;

wherein the fourth lateral face is a disk-shaped structure;

wherein the second lateral face is the lateral face selected from the plurality of lateral faces that has the congruent ends with the greatest surface area;

wherein the first lateral face is a disk-shaped structure;

wherein the first lateral face is the lateral face selected from the plurality of lateral faces that is distal from the third lateral face;

wherein the second lateral face is a disk-shaped structure;

wherein the second lateral face is the lateral face selected from the plurality of lateral faces that is distal from the fourth lateral face.

11. The suitcase with wagon-style cart capability according to claim 10 wherein the lid structure is a disk-shaped structure;

wherein the lid structure is geometrically similar to the open congruent end of the pan structure such that the lid structure will enclose the open congruent end of the pan structure;

wherein the lid structure controls access into the hollow interior of the pan structure through the open congruent end;

wherein the lid structure rotates between an open position and a closed position;

wherein the lid structure forms the physical containment space used to store the one or more horizontally oriented supporting surfaces on which the one or more additional luggage items of the client rest when the suitcase with wagon-style cart capability is used as a cart.

12. The suitcase with wagon-style cart capability according to claim 10 wherein the fastening structure secures the lid structure to the pan structure such that the lid structure rotates relative to the pan structure;

wherein the fastening structure secures the lid structure into a closed position that encloses the suitcase.

13. The suitcase with wagon-style cart capability according to claim 12 wherein the second telescopic handle attaches to the pan structure such that the direction of the expansion of the reach of the second telescopic handle forms a cant with the direction of the expansion of the reach of the first telescopic handle.

14. The suitcase with wagon-style cart capability according to claim 13 wherein the first telescopic structure is a composite structure;

wherein the first telescopic structure forms the first arm of the u-shaped structure of the first telescopic handle;

wherein the first telescopic structure attaches the first grip to the third lateral face of the pan structure;

wherein the first telescopic structure attaches to an end of the first grip such that the center axis of the composite structure of the first telescopic structure is perpendicular to the center axis of the first grip;

wherein the first telescopic structure is a telescopic device;

wherein by telescopic is meant that the span of the length of the center axis of the composite structure of the first telescopic structure is adjustable;

wherein the reach of the first telescopic handle adjusts by adjusting the span of the length of the center axis of the composite structure of the first telescopic structure;

wherein the second telescopic structure is a composite structure;

wherein the second telescopic structure forms the second arm of the u-shaped structure of the first telescopic handle;

wherein the second telescopic structure attaches the first grip to the third lateral face of the pan structure;

wherein the second telescopic structure attaches to an end of the first grip such that the center axis of the composite structure of the second telescopic structure is perpendicular to the center axis of the first grip;

wherein the second telescopic structure attaches to the end of the first grip that is distal from the first telescopic structure;
wherein the second telescopic structure is a telescopic device;
wherein by telescopic is meant that the span of the length of the center axis of the composite structure of the second telescopic structure is adjustable;
wherein the reach of the first telescopic handle adjusts by adjusting the span of the length of the center axis of the composite structure of the second telescopic structure;
wherein the first grip forms the crossbeam of the u-shaped structure of the first telescopic handle;
wherein the first grip attaches to the first telescopic structure and the second telescopic structure;
wherein the first grip attaches to the ends of the first telescopic structure and the second telescopic structure that are distal from the third lateral face of the pan structure;
wherein the first grip forms the graspable structure used to manipulate the suitcase with wagon-style cart capability;
wherein the second telescopic handle comprises a third telescopic structure, a fourth telescopic structure, and a second grip;
wherein the third telescopic structure is a composite structure;
wherein the third telescopic structure forms the first arm of the u-shaped structure of the second telescopic handle;
wherein the third telescopic structure attaches the second grip to the third lateral face of the pan structure;
wherein the third telescopic structure attaches to an end of the second grip such that the center axis of the composite structure of the third telescopic structure is perpendicular to the center axis of the second grip;
wherein the third telescopic structure is a telescopic device;
wherein by telescopic is meant that the span of the length of the center axis of the composite structure of the third telescopic structure is adjustable;
wherein the reach of the second telescopic handle adjusts by adjusting the span of the length of the center axis of the composite structure of the third telescopic structure;
wherein the fourth telescopic structure is a composite structure;
wherein the fourth telescopic structure forms the second arm of the u-shaped structure of the second telescopic handle;
wherein the fourth telescopic structure attaches the second grip to the third lateral face of the pan structure;
wherein the fourth telescopic structure attaches to an end of the second grip such that the center axis of the composite structure of the fourth telescopic structure is perpendicular to the center axis of the second grip;
wherein the fourth telescopic structure attaches to the end of the second grip that is distal from the third telescopic structure;
wherein the fourth telescopic structure is a telescopic device;
wherein by telescopic is meant that the span of the length of the center axis of the composite structure of the fourth telescopic structure is adjustable;
wherein the reach of the second telescopic handle adjusts by adjusting the span of the length of the center axis of the composite structure of the fourth telescopic structure;
wherein the second grip forms the crossbeam of the u-shaped structure of the second telescopic handle;
wherein the second grip attaches to the third telescopic structure and the fourth telescopic structure;
wherein the second grip attaches to the ends of the third telescopic structure and the fourth telescopic structure that are distal from the third lateral face of the pan structure;
wherein the second grip forms the graspable structure used to manipulate the suitcase with wagon-style cart capability.

15. The suitcase with wagon-style cart capability according to claim 14
wherein each of the plurality of casters attaches to an exterior surface of the suitcase that is selected from the group consisting of the closed congruent end of the pan structure and the first lateral face of the pan structure;
wherein each of the plurality of casters is a rotating structure that rotates around a first axis of rotation such that the plurality of casters will roll the suitcase over the supporting surface;
wherein each of the plurality of casters rotates around a swivel that rotates around a second axis of rotation such that the path of the rotation of each of the plurality of casters will adjust to changes in the primary sense of direction of the suitcase with wagon-style cart capability.

16. The suitcase with wagon-style cart capability according to claim 15
wherein each of the plurality of wheels attaches to the exterior surface of the closed congruent end of the pan structure;
wherein each of the plurality of wheels is a rotating structure that rotates around a third axis of rotation such that the plurality of wheels will roll the suitcase over the supporting surface.

17. The suitcase with wagon-style cart capability according to claim 16
wherein the plurality of casters comprises a first caster, a second caster, a third caster, a fourth caster, a fifth caster, and a sixth caster;
wherein the first caster is a rotating structure;
wherein the first caster attaches to the exterior surface of the closed congruent end;
wherein the second caster is a rotating structure;
wherein the second caster attaches to the exterior surface of the closed congruent end;
wherein the third caster is a rotating structure;
wherein the third caster attaches to the exterior surface of the closed congruent end;
wherein the fourth caster is a rotating structure;
wherein the fourth caster attaches to the exterior surface of the closed congruent end;
wherein when the first caster, the second caster, the third caster, and the fourth caster combine to transfer the full load of the suitcase with wagon-style cart capability to the supporting surface, the lid structure of the suitcase forms a horizontally oriented surface used to elevate and transport the one or more additional luggage items of the client;
wherein the first caster, the second caster, the third caster, and the fourth caster combine to allow the suitcase with wagon-style cart capability to roll over a supporting surface;
wherein the fifth caster is a rotating structure;
wherein the fifth caster attaches to the exterior surface of the first lateral face;

wherein the sixth caster is a rotating structure;
wherein the sixth caster attaches to the exterior surface of the first lateral face;
wherein the plurality of wheels comprises a first wheel and a second wheel;
wherein the first wheel is a rotating structure;
wherein the first wheel attaches to the exterior surface of the first lateral face;
wherein the second wheel is a rotating structure;
wherein the second wheel attaches to the exterior surface of the first lateral face;
wherein the fifth caster, the sixth caster, the first wheel, and the second wheel combine to allow the suitcase with wagon-style cart capability to roll over a supporting surface.

18. The suitcase with wagon-style cart capability according to claim 17
wherein a first strap extends from the third lateral face, and is adjustable in length;
wherein the first strap is designed to extend over top of the lid structure in order to secure other items thereon;
wherein the fourth lateral face has a second strap;
wherein the first strap is able to secured to the second strap via a male clip and a female clip, respectively.

* * * * *